April 7, 1970  F. PRADKO ET AL  3,504,540
FOOT PAD FORCE MEASUREMENT INSTRUMENT
Filed Dec. 6, 1968
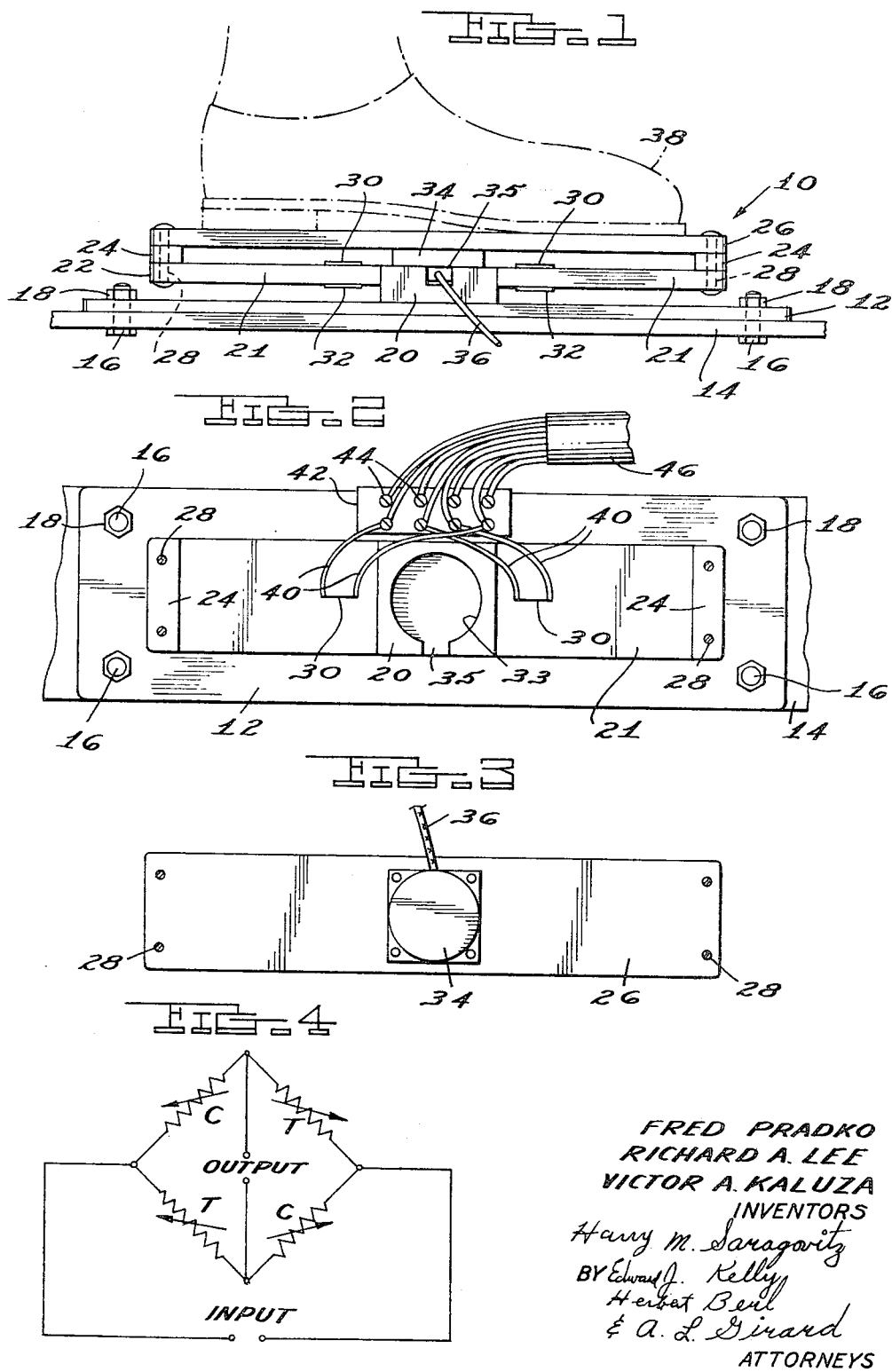
FRED PRADKO
RICHARD A. LEE
VICTOR A. KALUZA
INVENTORS
Harry M. Saragovitz
BY Edward J. Kelly
Herbert Berl
& A. L. Girard
ATTORNEYS

United States Patent Office 3,504,540
Patented Apr. 7, 1970

3,504,540
FOOT PAD FORCE MEASUREMENT
INSTRUMENT
Fred Pradko, Utica, Richard A. Lee, Warren, and Victor A. Kaluza, Mount Clemens, Mich., assignors to the United States of America as represented by the Secretary of the Army
Filed Dec. 6, 1968, Ser. No. 781,737
Int. Cl. G01b 5/12
U.S. Cl. 73—141                                2 Claims

ABSTRACT OF THE DISCLOSURE

A foot pad force measurement device designed for orientation below the feet of a test subject during vibration testing, which device utilizes a double cantilever beam and strain gage arrangement is disclosed.

---

The present invention may be manufactured and used by or for the Government for governmental purposes without the payment of any royalty thereon or therefor.

The present invention relates to force measurement devices for use in the vibrational testing of vehicles or other equipment designed to house human subjects, and more particularly to a double cantilever beam-strain gage arrangement which permits accurate monitoring of vibrational forces upon the feet of a subject during such testing.

In the testing of vehicles and other equipment suited to operate while housing a human subject, it is one aim of the evaluator to determine the exact amount of force absorbed by the subject at all points of contact with the equipment being tested, the feet are one such point of contact. These determinations are particularly important in vehicle simulations and other similar experimental equipment.

Until now force measurement instruments designed for placement under the feet of a test subject have not been widely employed. Very little effort has been expended in this direction, and hence, very little, if any useful equipment designed or produced for this purpose.

As in the case of all testing equipment, it is important that the foot pad force measurement device not only be accurate, but as is particularly important in this case, durable in view of the type of phenomenon (vibration) to be evaluated.

It is therefore an object of the present invention to provide a durable device for the accurate measurement of the vibrational forces applied to the feet of a test subject during vibrational or endurance testing.

Other objects and advantages of the present invention will be made obvious to those skilled in the art by the following description when considered in relation to the accompanying drawing of which:

FIG. 1 is a side elevational view of the force measurement device of the present invention;

FIG. 2 is a top view of the force measurement device of the present invention with the combination cover plate and foot pad portion thereof removed;

FIG. 3 is a bottom view of the combination cover plate and foot pad of the force measurement device of the present invention; and FIG. 4 is a schematic diagram of a portion of the wiring of the force measurement device of the present invention.

As shown in FIG. 1, the force measurement device 10 of this invention is mounted on a base plate 12 which is secured by bolts 16 and nuts 18 to a portion 14 of the item or equipment being tested. Mounted on the base plate 12 (in any suitable fashion such as welding) and preferably at the center thereof is a support member 20 which forms a fulcrum for the double cantilever beam 21. Mounted at either extremity of double cantilever beam 21 are cover plate supports 24 which serve to transmit the forces applied to cover plate 26 directly to the extremities of beam 21 by the foot of the test subject so that a maximum deflection of the beam per unit of force is produced and larger, more easily detected, measured and recorded valves therefore are achieved. The beam 21, supports 24 and cover plate 26 are secured together by means of rivets 28 or any other suitable securing means. The foot of the subject 38, is applied directly to the cover plate 26.

The strain gages 30 and 32 are applied directly to the cantilever beam and preferably comprise wire-type strain gages which vary their resistance with tension and compression. Since the double cantilever beam 21 actually consists of two cantilevers on opposite sides of the fulcrum 20, strain gages are mounted on opposite sides thereof. The gages shown at 30 in the drawing are mounted on the upper surface of the double cantilever beam in an opposing relationship on either side of the fulcrum 20. The gages 32 are mounted on the lower surface of double cantilever beam 21, again in opposing relationship on either side of fulcrum 20 and in registration with strain gages 30 such as that in the top view shown in FIG. 2, strain gages 30 are actually superimposed on strain gages 32.

Since maximum deflection in the beam 21 occurs in the immediate vicinity of fulcrum 20, it is preferred that the strain gages 30 and 32 be attached to the double cantilever beam as described above, but as close to the fulcrum as is practical under the circumstances of use, space function etc. Such mounting close to the fulcrum assists in providing relatively large deflection values which simplify the problems of sophistication of measuring equipment and accuracy in data monitoring and recording.

In the embodiment depicted in the drawing, mounted within a cavity 33 (seen clearly in FIG. 2) and attached to cover plate 26 is an accelerometer 34 which serves to measure the forces of acceleration applied to the cover plate 26 by the test subject's foot. The accelerometer can, but need not be, incorporated into the apparatus disclosed here. When present it provides another form of data regarding another parameter which may be useful in a total evaluation of the equipment under study. When the accelerometer 34 is used in the apparatus, a cavity 33 is provided in fulcrum 20. A gap 35 in the fulcrum 20 which permits the passage of wires or other means for detecting the signals produced by accelerometer 34 is also provided. In the instant case, gap 35 is provided for the passage of wire 36 which is functionally linked to instruments for recording the data transmitted from the accelerometer.

FIG. 2, which is a top view of the apparatus of the present invention with cover plate 21 removed, shows portions of the device not visible in the view of FIG. 1.

In this view, the cavity 33, and gap 35 in fulcrum 20 are seen more clearly.

The wires 40 attached to strain gages 30 provide the means whereby changes in the resistance of gages 30 caused by compression or tension therein are detected. Similar wires 41 (not shown) are attached to gages 32 which lay in registration directly below gages 30 and all of the wires are connected to a platform 42 by means of screws 44. From platform 42 the wires are now via conduct 46 to the data output instruments which produce usual or other types of display of the stresses applied to the strain gages by virtue of the deflection of the double cantilever beam caused by the pressure of foot 38 against cover plate 26.

FIG. 4 shows a schematic wiring diagram of the device. As shown therein, the various gages are connected to form a Wheatstone bridge. The letters T and C designate the variable resistance alternately undergoing tension and compression respectively. As explained below, after each half cycle of cantilever motion the T and C designations reverse themselves.

When the vehicle or other equipment containing or in contact with the human subject undergoes vibration, the cantilever of the double cantilever beam responds thereto by oscillating in a generally up and down direction with respect to the fulcrum. This motion alternately produces tension and compression in the strain gages which in turn change their respective resistances. In considering the first oscillation of the cantilever during a vibration, the following events take place:

(1) during the half cycle when the equipment being tested is in a generally downward motion, inertia causes the cantilever to be in upward motion. This produces tension in the strain gages on the lower surfaces of the cantilever and compression in the gages mounted on the upper surfaces thereof; and (2) as the vehicle or other tested equipment begins its upward motion the cantilevers begin their downward motion and hence produce compression in the strain gages on the lower surfaces of the cantilevers and tension in those on the upper surfaces. Since the strain gages are wired into an electrical bridge circuit, any change in their resistance is easily recorded. From these fluctuating resistances it is possible to determine through a direct proportion using conventional and well known techniques the cyclic forces being absorbed by the subject's feet.

Thus, from the electric message produced by the mechanical motion of the cantilevers it is possible to determine the exact forces experienced at the subject's feet.

Since it is obvious that many changes and modifications can be made in the above-described details without departing from the nature and spirit of the invention, it is to be understood that the invention is not limited to said details except as set forth in the appended claims.

We claim:

1. A force measurement device designed for orientation below the foot of a test subject said device comprising a double cantilever beam having a first cantilever and a second cantilever, and an upper surface and a lower surface, a support means located at the center of said double cantilever beam forming a fulcrum therefor, at least one set of four strain gages mounted on said double cantilever beam, a first pair of said strain gages being mounted in opposed relation on said upper surface of said double cantilever beam on different cantilevers and in the vicinity of said fulcrum, a second pair of said strain gages being mounted in registration below said first pair of strain gages on said lower surface of said double cantilever beam in opposed relationship on different cantilevers and in the vicinity of said fulcrum, means for detecting and measuring strains in said gages caused by the pressure of said subject's foot pushing on said double cantilever beam, a cover plate, and at least two cover plate support members, each mounted at an opposing extremity and upon said upper surface of said double cantilever beam, said cover plate mounted upon and joining said cover plate support members, a base to which said support members are fastened, and accelerometer means mounted between said cover plate and said base and means for detecting and measuring the forces applied thereto during testing.

2. A force measurement device in accordance with claim 6 including a cavity in said support means within which at least a portion of said accelerometer means is housed.

References Cited

UNITED STATES PATENTS

| 2,688,873 | 9/1954 | Burris-Meyer | 73—172 |
| 2,290,387 | 7/1942 | Schwartz | 73—172 |
| 3,305,036 | 2/1967 | Walters | 73—172 |

S. CLEMENT SWISHER, Primary Examiner

U.S. Cl. X.R.

73—172, 432